(12) United States Patent
Chang

(10) Patent No.: US 12,540,299 B2
(45) Date of Patent: Feb. 3, 2026

(54) CARRIER FOR CELL BIOMASS PRODUCTION AND CELL CULTURE DEVICE COMPRISING THE SAME

(71) Applicant: ESCO BIOENGINEERING CO., LTD., Taichung (TW)

(72) Inventor: King-Ming Chang, Taichung (TW)

(73) Assignee: ESCO BIOENGINEERING CO., LTD., Taichung (TW)

( * ) Notice: Subject to any disclaimer, the term of this patent is extended or adjusted under 35 U.S.C. 154(b) by 897 days.

(21) Appl. No.: 17/786,028

(22) PCT Filed: Dec. 16, 2020

(86) PCT No.: PCT/CN2020/136665
§ 371 (c)(1),
(2) Date: Jun. 16, 2022

(87) PCT Pub. No.: WO2021/129472
PCT Pub. Date: Jul. 1, 2021

(65) Prior Publication Data
US 2023/0018016 A1  Jan. 19, 2023

Related U.S. Application Data

(60) Provisional application No. 62/953,575, filed on Dec. 25, 2019.

(51) Int. Cl.
*C12M 1/12* (2006.01)
*C12N 5/00* (2006.01)

(52) U.S. Cl.
CPC ............ *C12M 25/02* (2013.01); *C12M 25/14* (2013.01); *C12N 5/0062* (2013.01); *C12N 5/0068* (2013.01)

(58) Field of Classification Search
CPC ..... C12M 25/02; C12M 25/14; C12N 5/0062; C12N 5/0068
See application file for complete search history.

(56) References Cited

U.S. PATENT DOCUMENTS 5,015,576 A  5/1991  Nilsson et al.
5,114,855 A  5/1992  Hu et al.
(Continued)

FOREIGN PATENT DOCUMENTS

CN  101100641 A  1/2008
CN  102409020 A  4/2012
(Continued)

OTHER PUBLICATIONS

Microcarrier Cell Culture: Principles and Methods, Pharmacia Fine Chemicals, 1981, pp. 5-33, Uppsala, Sweden.
(Continued)

*Primary Examiner* — Michael L Hobbs
(74) *Attorney, Agent, or Firm* — MUNCY, GEISSLER, OLDS & LOWE, P.C.

(57) ABSTRACT

A three-dimensional porous growth surface (carriers) and cell culture devices including the same are provided. The carriers are made by multiple layers of netting or mesh, especially large dimension and area of fabrics that are capable to form a column-type fixed bed by rolling the layers or other shape of fixed bed by stacking or randomly disposed packing the carriers to form a packed-bed for cell culture the layers together, thereby sealing the surrounding of the multilayer nettings or meshes to reduce particle generation during cell harvest, or ease of separation by filtration due to larger wall dimension on the nettings or meshes than cells. The fixed bed make by large dimension of the growth surface can easily to manufacture a fixed bed simply by rolling the multiple layers of sheets, which can reduce the (Continued)

manufacture cost and also facilitate mass production of carriers for fixed bed bioreactors.

17 Claims, 10 Drawing Sheets

(56) References Cited

U.S. PATENT DOCUMENTS

| | | | |
|---|---|---|---|
| 5,385,836 | A | 1/1995 | Kimura et al. |
| 5,565,361 | A | 10/1996 | Mutakis et al. |
| 5,739,021 | A | 4/1998 | Katinger et al. |
| 6,214,618 | B1 | 4/2001 | Hillegas et al. |
| 9,440,007 | B2 | 9/2016 | Gingras |
| 2006/0141012 | A1* | 6/2006 | Gingras ............ B32B 38/0008 424/442 |
| 2008/0118976 | A1 | 5/2008 | Kitagawa et al. |
| 2018/0282678 | A1* | 10/2018 | Castillo ................ C12M 25/14 |
| 2020/0157493 | A1* | 5/2020 | Ginn ..................... D04B 21/08 |

FOREIGN PATENT DOCUMENTS

| | | |
|---|---|---|
| CN | 102719391 A | 10/2012 |
| CN | 103403149 A | 11/2013 |
| CN | 103642680 A | 3/2014 |
| CN | 108138098 A | 6/2018 |
| CN | 208454986 U | 2/2019 |
| CN | 208667743 U | 3/2019 |
| EP | 3199239 A1 | 8/2017 |
| EP | 3492578 A1 | 6/2019 |
| EP | 4055139 | 9/2022 |
| JP | 2010063378 A | 3/2010 |
| JP | 5283606 B2 | 9/2013 |
| JP | 201997392 A | 6/2019 |
| JP | 2019534049 A | 11/2019 |
| TW | 200700552 A | 1/2007 |
| WO | WO 2010/074982 A1 | 7/2010 |
| WO | WO 2017/129367 A1 | 8/2017 |
| WO | WO 2018/087235 A1 | 5/2018 |

OTHER PUBLICATIONS

Butler, M., "Growth Limitations in Microcarrier Cultures", Advances in Biochemical Engineering/Biotechnology vol. 34, 1987, pp. 57-84.

* cited by examiner

300

|  | cell count/ml | volume (ml) | total harvest cells | recovery rate |
|---|---|---|---|---|
| Group 1 | 3.19E+06 | 30 | 9.57E+07 | >99% by checking with cell residues in the growth surface |
| Group 2 | 3.01E+06 | 30 | 9.03E+07 | >90% by checking with cell residues in the growth surface |

Figure 17

| Particle Count | Observed particles |
|---|---|
| Frist repeat | 0 |
| Second repeat | 0 |
| Third repeat | 0 |

Figure 18

CARRIER FOR CELL BIOMASS PRODUCTION AND CELL CULTURE DEVICE COMPRISING THE SAME

CROSS REFERENCES

This Application is a national stage application under 35 U.S.C. 371 and claims benefit of PCT Application No. PCT/CN2020/136665 filed on Dec. 16, 2020, which designated the United States and titled as "A CARRIER FOR CELL BIOMASS PRODUCTION AND CELL CULTURE DEVICE COMPRISING THE SAME". The PCT application claimed benefit of U.S. provisional Patent Application No. 62/953,575 filed on Dec. 25, 2019 and titled as "A Cell Cultivation Matrix For Biomass Production", the disclosure of which is hereby incorporated by references.

1. FIELD OF THE INVENTION

The present invention relates to a field of cell culture carrier, particularly to a field of cell culture carrier for biomass production of eukaryotic cells.

2. DESCRIPTION OF THE PRIOR ART

With rapid progress of biotechnology, any cell culturing technology either for prokaryotic cells or eukaryotic cells has been becoming increasingly important. Generally, eukaryotic cells are slow growing and vulnerable to injuries caused by shear stress and contamination. Majority of the eukaryotic cells are anchorage-dependent and require a growth surface for them to adhere and grow. In order to accommodate of this kind of eukaryotic cell cultures, various carriers with growth surfaces have been developed. Currently most available carriers are smooth surface carriers made by dextran-based material, porous matrix made by polyurethane or polyethylene terephthalate, and semi-permeable membrane such as hollow fibers made by polysulfone or cellulose acetate. However, the harvest of cells from those carriers is tedious, susceptible to contamination, and often is nearly impossible, especially for the carriers with porous structure. Therefore, the scale up for anchorage-dependent cells has been a slow, labor intensive and expensive process. Because of this, there is strong need to develop a culture carrier which may solve this cell harvesting problem.

There are two major types of carriers for anchorage-dependent cells including particulate smooth surface carriers (nonporous or poreless) and porous carriers. The smooth surface does not lend itself to a large growth surface area and thus limits the number of cells to be adhered and grown. The porous carrier on the other hand provides at least one three-dimensional cavity to house cells. The porosity of the carriers also creates additional surface areas for cell anchorage that protects cells from being indirect contact with shear stress created by aeration, agitation and feeding. However, the task of harvesting cells from the porous carriers is often very difficult. The first porous carrier that are capable for cell recovery is the BioNOC® II carriers (CESCO® Bioengineering Co., Ltd.) made by polyester non-woven fabrics. The capability of cell recovery from the porous BioNOC® II carriers is due to the pores are form by horizontally layering the fibers on a plane and heat pressed to form multilayer structure where the openings form in among the fibers are all toward the same direction, which make the cell release feasible than other porous materials where the pores are form as channels inside the matrixes with random direction of outlet. However, there are some drawbacks on the design of BioNOC® II carriers especially for cell recovery: 1. The pores form by randomly layering the fibers cause a more than twenty multiple-layer structure with irregular pore size from couple micron to hundreds microns. Cell release does not as straightforward as plain surface due to the physical obstacle from >20 layers of fibers: 2. Fibers are easily released during cell recovery process and contaminated with collected cells: 3. Those fibers are with similar dimension of cells, which make it more difficult to be separated from cells. The cost of isolation and cell loss during the process impede the application of BioNOC® II carriers in cellular production field. Above drawbacks limits certain applications or increase the production cost especially for those cells themselves are the target of the biological products.

Revolutionary advances in biotechnology and genetic engineering have created high market demand to cellular products, such as protein pharmaceuticals, cytokines, monoclonal antibodies, viral products, vaccines, nucleic acids, enzymes, and cells and/or tissues. The demand of these products has thus created an ever-increasing need for efficient and economic methods of production.

Eukaryotic cells such as mammalian cells have become most popularly for providing high quality and quantity of efficacious protein or cellular products. Culturing mammalian cells has long been used to produce vaccines, genetically engineered proteins, pharmaceuticals and other cellular products. Generally, eukaryotic cells can be anchorage-dependent, anchorage-independent or both. Anchorage-dependent cells require a growth surface to anchor, mature and produce desired cellular products. Examples of anchorage-dependent cells are embryonic stem cells, mesenchymal stem cells, fibroblasts, epithelial cells and endothelial cells. Eukaryotic cells such as lymphocytes, some transformed cells and some cancer cells are "anchorage-independent" cells and can grow in suspension. Regardless of its type, most eukaryotic cells in culture have the following characteristics in common and these characteristics play a key role in designing an efficient growth surface and cultivating devices.

The attachment of anchorage-dependent cells to a growth surface is the key to cell vitality and fundamental to all types of culture techniques including but not limited to traditional monolayer culturing or culturing with a carrier and/or microcarrier system. Since the proliferation of anchorage-dependent cells can only occur after adhesion to a suitable growth surface, it is important to use surfaces and culture procedures which promote cell adhesion. Cell adhesion includes adsorption of attachment factors such as proteins to a cultivation surface, contacting the cells with the cultivating growth surface, attaching the cells to a treated surface suitable for cell adhesion, spreading and replicating the adhered or attached cells across the growth surface until these cells come into contact with another surface-growing cell (i.e., "contact inhibition").

In order to have a viable anchorage-dependent cell culture, the culture needs an appropriate cultivating growth surface or carrier, a mechanism for circulating culture medium particular to the cell type to be cultured and proper aeration with an adequate supply of gas to support and maintain cell growth. There are several different ways to culture cells and they are batch system in which nutrients are not replenished during cultivation although oxygen is added as required, fed batch systems in which nutrient and oxygen are monitored and replenished as necessary and perfusion systems in which nutrient and waste products are monitored and controlled with continuous replenishment of fresh medium.

There are several types of cultivation carriers that are currently known in the art. For example, dextran-based (e.g., Cytodex I, DEAE-dextran and Cytodex III, porcine collagen-coated dextran: Cytiva, US, formally GE Healthcare Life Sciences) or coated polystyrene-based (e.g., SoloHill, U.S.) microcarrier. Microcarriers are typically very small and have diameters of approximately 50 to 250 micrometers, although larger or smaller sizes of microcarriers have been used (U.S. Pat. No. 5,114,855 issued May 19, 1992 to Hu et al.). A second type of cell-cultivation carrier includes a porous matrix material made from ceramics, polyurethane foam, or fabrics made by polyethylene terephthalate (PET), or biodegradable material from PLGA, collagen, chitosan.

Cell cultivation carriers can also be categorized according to its surface property. For example, there are non-porous or poreless and porous carriers. The porous carriers are generally more advantageous than the non-porous carriers since the porous carrier provides a greater surface-to-volume ratio as well as protection to insulated cells. Because of its porous nature, these carriers form multiple three-dimensional cavities within the growth surfaces and thus maximizes cell attachment and also protect cells from being dislodged and/or damaged from shearing stress resulted from aeration, agitation and impact during feeding and/or harvesting processes.

Many cell-cultivating systems currently available in the art employ microcarriers that are either porous and/or non-porous or poreless. These microcarriers such as microcarrier beads currently available are used in anchorage-dependent cell production systems. These microcarriers must be used in conjunction with a stirring equipment and/or aeration capability. However, a common problem with microcarrier systems is that the stirring action required to sustain the cell culture can damage or even kill the cells thereby decreasing the efficiency of the cultivation system and the production of the desired cellular product.

Microcarrier systems can also be fabricated in small spheres from an ion exchange gel, dextran, polystyrene, polyacrylamide, or collagen-based material. These materials have been selected for their compatibility with cells, resilience to agitation and specific gravities that can maintain the microcarriers suspended in growth media. Microcarriers are generally kept in a growth medium suspension with gentle stirring within a vessel in order to ensure equal distribution of nutrients and air to all cells. Microcarrier system is currently considered to be the most suitable system for large-scale cell culture because it has the highest surface to volume ratio and enables even distribution of nutrients to cells.

Nevertheless, current microcarrier culture system has serious disadvantages. These disadvantages include high costs and high cell mortality rates due to exposures to high levels of shearing forces caused by stirring and aeration during cultivation. Most commonly used microcarriers utilize porous non-rigid dextran as a support matrix. This compressible matrix is thought to reduce potential damages to the microcarriers and their attached cells when the microcarriers collide in agitated reactors (Microcarrier Cell Culture: Principles and Methods, Pharmacia Fine Chemicals, Uppsala, Sweden, pages 5-33 (1981)). These porous microcarriers however, also have serious disadvantage in retaining cellular products that results in the adsorption of growth factors and other components from the medium (Butler, M., "Growth Limitations in Microcarrier Cultures", Adv. Biochem. Eng./Biotech. 4:57-84 (1987)).

U.S. Pat. No. 5,015,576 issued May 14, 1991 to Nilsson et al. relates to making particles which enclose cavities by adding a water-insoluble solid, liquid or gaseous cavity generating compound to an aqueous solution of matrix material. Subsequent to forming particles by dispersion in a water-insoluble dispersion medium, the matrix is rendered insoluble in water by cooling, covalent cross-linking or by polymerization. The cavity generating compound is washed out, whereafter the particles can be used as ion exchangers in gel filtration processes, in hydrophobic chromatography or in affinity chromatography, optionally subsequent to derivatizing the particles. The particles can also be used as microcarriers for cultivating anchorage-dependent cells.

U.S. Pat. No. 5,385,836 issued Jan. 31, 1995 to Kimura et al. relates to a carrier for animal cells attachment during cell culturing or for immobilization of animal cells. This carrier is produced by coating a porous substrate with a cell adhesive material in the form of a mixture containing chitosan. The porous substrate is a nonwoven fabric prepared by impregnating a nonwoven fabric web with a binder resin which contains silk fibroin, gelatin and chitosan. Coating is carried out by contacting the nonwoven fabric with a solution prepared by adding silk fibroin and gelatin to an acidic aqueous solution of chitosan to coat the nonwoven fabric, drying the coated nonwoven fabric and treating the dried nonwoven fabric with an alkali to render the chitosan insoluble.

U.S. Pat. No. 5,565,361 issued Oct. 15, 1996 to Mutsakis et al. relates to a bioreactor having a motionless mixing element with attached cells method for the enhanced cultivation and propagation of cells in a bioreactor. The bioreactor has a housing and a motionless mixing element, the attachment of cells to the mixing element and a nutrient composition permitting attached cells to grow and divide. The motionless mixing element and the bioreactor have a porous, fibrous sheet material such as a corrugated or knitted woven wire material, such as stainless steel or titanium, and predetermined dimensions for the height and diameter of the fiber in order to provide a maximum surface area for the attachment of the cells to be cultivated.

U.S. Pat. No. 5,739,021 issued Apr. 14, 1998 to Katinger et al. relates to a porous carrier for biocatalysts with a water-insoluble inorganic filler and a polyolefin binder selected from polyethylene and polypropylene, has open pores to allow cells to penetrate and grow within its pores. The density is above 1 $g/cm^{0.3}$.

U.S. Pat. No. 6,214,618 issued Apr. 10, 2001 to Hillegas et al. relates to a method of making microcarrier beads by forming a bead made of a lightly crosslinked styrene copolymer core with functional groups on the surface of the bead and washing the microcarrier beads with basic and acidic solutions to make the beads compatible for cell culture. The microcarrier bead can also be made of a styrene copolymer core with a tri-methylamine exterior which has been washed in basic and acidic solutions to make the beads compatible for cell culture.

Notwithstanding the variety of carriers taught in the foregoing art for cell cultivation, none of the carriers is capable of cover the requirement of high cell density in 3D culture, easy cell recovery, and without any particle releasing together with the harvest cells.

SUMMARY OF THE INVENTION

To overcome the shortcomings of those carriers, our solution is: first, to use nettings or meshes instead of fibers as the base of the carriers; second, use sheets of nettings/meshes, and layer the nettings/meshes to mimic the structure the non-woven fabric carriers, i.e. BioNOC® II carriers; third, seal the edge surround the multilayer netting/mesh structures by heat, ultrasound or adhesive to avoid any release of the fabrics; and fourth, roll or stack or pack (randomly disposed) the multiple layer of nettings/meshes into a column, or other defined shape or structure, to work as a fixed bed in a fixed bed culture system, especially BelloCell® and TideCell® system with TideMotion™ culture mechanism, where the definition of TideMotion™ culture mechanism means a culture method by submerging and emerging the fixed bed with porous matrixes intermittently in order to bring in nutrient and oxygen to nourish the cells grown on/inside the porous matrixes as well as to remove waste and excess carbon dioxide out from the porous matrixes. Under this design, it provides several advantages over the non-woven fabric carriers: 1. the pore (opening) shape and pore (opening) size in each layer is consistent: 2. The sheet made by multiple layers of nettings or meshes can be stacked, or roll, or randomly disposed packed or in other format to construct a matrix bed in a packed-bed bioreactor allowing high cell density cell culture and cell recovery: 3, the number of layers could be reduced which could facilitate cells release from the carriers than non-woven fabric carriers: 4, the netting or mesh is sturdy and not easy to release particles or fibers than nonwovens especially after the surrounding of the netting structure are sealed: 5, the yarn diameter of the nettings/meshes is much larger than cells so that it could be easily separated from cells through filtration if any particle generated due to the release from the nettings/meshes; and 6. The matrix bed by rolling or stacking or randomly disposed packing with the multiple layer of netting/mesh structure can maximize the surface area for cell growth, especially when apply in TideCell® or BelloCell® systems. As a result, high cell density culture and high yield of cell production with least possibility of particle release can be achieved through the novel design of carriers.

The present invention teaches generally a cell-cultivating growth surface and structure made by sheets or strips and multiple layers of nettings or meshes, which significantly improve efficiency in culturing of anchorage-dependent cells and recover the cells from the growth surface. More specifically, the invention teaches a novel growth surface and structure and method of manufacturing the same. The present invention claims and discloses a novel growth surface and structure for culturing cells that maximizes cell attachment and cell growth, increases cell density, enhance cell recovery, and avoid particles releasing from the said growth surface. Therefore, the unique cell cultivating growth surface, structure and method of application in accordance with the present invention remedies the shortcomings and the deficiencies of the existing technology and make the cell/tissue culture for cellular production application practical.

The present invention teaches a novel structure of carriers that are form by multilayers of nettings or meshes with consistent pore structure and dimension in each layer. The layer of nettings or meshes may be with larger dimension so as to roll or stack to form a single fixed bed unit, or with smaller dimension and dispose those small pieces of carriers in a restricted and defined space to form a fixed bed. The surrounding of the multilayer nettings/meshes structure are sealed by heat press, ultrasonic press or adhesive in order to prevent or reduce the fibers or particle released from the netting/meshes. The dimension of the sheet made by nettings/meshes fabric can be from 1 cm×20 cm, to 10 m×100 m, depending on the size of the fixed bed. More precisely, the dimension of the sheet made by nettings/meshes fabric can be from 3 cm×50 cm, to 2 m×20 m. The matrix bed can also form by randomly disposed packing with small pieces of carriers with the same structure by combining multiple layers of cell growth netting/mesh and a layer of spacer netting/mesh. If it's with smaller dimension for disposing on the fixed bed space, the dimension of the sheet made by nettings/meshes fabric can be from 0.3 cm~1 cm×0.5 cm~10 cm. More precisely, the dimension of the sheet made by nettings/meshes fabric can be from 0.5 cm~1 cm×1 cm~5 cm. Where the definition of netting or mesh is: a mesh (also called netting fabric) is often defined as fabric that has a large number of spaced holes characterized by its net open appearance, and the spaces between the yarns. It may be knit, woven, extruded, or knotted (net) in construction and is available in a variety of constructions including knits, laces, or crocheted fabrics.

Other than woven fabric, the definition of non-woven fabric is a fabric-like material made from staple fiber (short) and long fibers (continuous long), bonded together by chemical, mechanical, heat or solvent treatment.

The netting/mesh is surface treated to be biocompatible and hydrophilic that enables cell attachment and growth. Outer surface of the netting/mesh is with a layer of netting/mesh that is with larger pore dimension, larger wall thickness, and with or without the requirement of surface treatment, which mainly work as a spacer to allow medium or air to flow freely between layers of treated netting/mesh. The multilayer netting/mesh structure can form a large matrix bed by rolling with sheets that is made by stacking multiple layers of cell growth netting/mesh and a layer of spacer netting/mesh. The dimension of the sheet before rolling or stacking can be from 1 cm×20 cm, to 10 m×100 m, depending on the size of the fixed bed. More precisely, the dimension of the sheet made by nettings/meshes fabric before rolling or stacking can be from 3 cm×50 cm to 2 m×20 m. The matrix bed can also form by randomly disposed packing with small pieces of carriers with the same structure by combining multiple layers of cell growth netting/mesh and a layer of spacer netting/mesh. The sheet of nettings/meshes may have the small sizes of 0.3 cm~1 cm×0.5 cm~10 cm, and more preferably, 0.5 cm~1 cm×1 cm~5 cm. The yarn as a longitude line or latitude line with the sheet may have a width from 50 um~1000 um, and preferably, 50 um~500 um. The yarn is easily separated from culturing cells by filtering because of its width far larger than the dimension of cell (about 5 um~20 um). From a cross section view, the shape of one yarn as a longitude line or latitude line with the sheet may be, but not limited to, circle, oval or rectangle. Thus, the size of the yarn may be as dimension or width illustrated in the present invention. After rolling, stacking or randomly disposed packing the multiple layer netting/mesh structure and forming a fixed-bed for fixed-bed bioreactor, the structure is the best application in TideMotion™ system such as BelloCell®, or TideCell® where the mechanism of cell culture is done by submerge the fixed-bed with culture medium and emerge the fixed-bed with culture medium intermittently. Due to the TideMotion™ culture mechanism, the culture medium can leave the fixed-bed and allow the fresh air to enter the fixed-bed. Therefore the maximum surface area for cell growth can be achieved.

In view of both the great importance of cell cultivation processes and the deficiencies of the carrier systems currently known in the art, the present invention teaches and claims an cultivating carrier system that can allow cell culture in 3-D and high cell density, it can be allocated to facilitate the free flowing of the culture medium within the cultivation vessels or bioreactors. The unique properties of the carrier system could facilitate cell or tissue harvest after cell culture with the minimal possibility to release any particles from non-cell sources. Even any particles generated from the nettings or meshes, due to higher wall diameter than cells, could be easily removed simply through filtration. Thus, the cell cultivating growth surface and structure in accordance with the present invention remedies the shortcomings and the deficiencies of the existing technologies.

The present invention provides an efficient and novel growth surface and structure suitable for culturing cells and follows with cell or tissue harvest in large scale, and its method of manufacture thereof. The objects of the present invention includes but are not limited to: providing a novel cell cultivating growth surfaces, that are consistent in opening dimension, are able to support cell adhesion, and growth for more consistent performance: providing a cell cultivating growth surface that could maximize the cell growth surface area by integrating with packed-bed systems such as Tide-Motion™ cell culture system, such as BelloCell®, and TideCell®: providing a cell cultivating growth surface that is able to facilitate tissue or cell mass harvest after culture is completed, and providing a cell cultivating growth surface that will have minimum chance to release non-cell related particles during cell culture and cell harvest.

The present invention teaches a three-dimensional porous growth surface made from nettings or meshes with natural or artificial polymer materials, especially polyethylene terephthalate (PET), is disclosed to enhance cell growth surface, promote cell immobilization, promote cell propagation, maintain surface structure integrity, enable cell recovery, without releasing any artificial particles, and thus increase cellular production.

Accordingly, a carrier for cell culture includes a netting/mesh structure unit. The netting/mesh structure unit includes at least a first netting/mesh film with a plurality of first meshes formed by crossing a plurality of first longitude lines and a plurality of first latitude lines, wherein the first netting/mesh film is biocompatible and hydrophilic; and at least a second netting/mesh film with a plurality of second meshes formed by crossing a plurality of second longitude lines and a plurality of second latitude lines, wherein the second netting/mesh film is parallel to the first netting/mesh film and disposed under or on the first netting/mesh film.

Preferably, the netting/mesh structure unit includes two layers of the first netting/mesh film and one layer of the second netting/mesh film, and wherein the second netting/mesh film is disposed between the two layers of the first netting/mesh film, or on the two layers of the first netting/mesh film, or under the two layers of the first netting/mesh film.

Preferably, the netting/mesh structure unit includes at least three layers of the first netting/mesh film and one layer of the second netting/mesh film, and wherein the second netting/mesh film is disposed between any two layers of the first netting/mesh film, or on the three layers of the first netting/mesh film, or under the three layers of the first netting/mesh film.

Preferably, a material of the first netting/mesh film includes polyethylene terephthalate (PET), and a material of the second netting/mesh film comprises terephthalate (PET), polyethylene polypropylene (PP), polyethylene (PE), polytetrafluoroethylene (PTFE) or nylon.

Preferably, an opening (pore dimension) of any one of the first meshes is from 30 um to 800 um, and an opening (pore dimension) of any one of the second meshes is from 1 mm to 5 mm.

Preferably, the first netting/mesh film is of a netting/mesh material with hydrophilic surface treatment and the second netting/mesh film is of supportive netting/mesh material.

Preferably, a type of the carrier is one or more columns by curling the netting/mesh structure unit, one or more columns by sequent laminating the plural netting/mesh structure units, or a stacked body by randomly disposed packing the netting/mesh structure units.

Preferably, the edge surrounds of the first netting/mesh film and the second netting/mesh film are sealed together by heat pressing, ultrasonic or adhesive treatment.

Preferably, openings (pore dimensions) of the first meshes of the first netting/mesh film are totally or partially the same.

Preferably, openings (pore dimensions) of the second meshes of the second netting/mesh film are totally or partially the same.

Preferably, any one of the first longitude lines, any one of the first latitude lines is of a width from 50 um to 500 um, any one of the second longitude lines, or any one of the second latitude lines is of a width from 100 um to 1000 um.

Preferably, any one of the first longitude lines, any one of the first latitude lines is of a width from 50 um to 250 um, any one of the second longitude lines, or any one of the second latitude lines is of a width from 250 um to 500 um.

Accordingly, a cell culture device includes the carrier for cell culture and a culturing chamber disposing the carrier for cell culture. The carrier for cell culture includes at least a first netting/mesh film with a plurality of first meshes formed by crossing a plurality of first longitude lines and a plurality of first latitude lines, wherein the first netting/mesh film is biocompatible and hydrophilic; and at least a second netting/mesh film with a plurality of second meshes formed by crossing a plurality of second longitude lines and a plurality of second latitude lines, wherein the second netting/mesh film is parallel to the first netting/mesh film and disposed under or on the first netting/mesh film.

More preferably, the novel growth surface in accordance with the present invention is made from multiple layers of netting or mesh including at least one layer of surface treated PET nettings/meshes with opening from 30 um to 800 um for cell attachment and growth, together with a layer of treated or non-treated netting/meshes with opening from 1 mm to 5 mm, preferably polypropylene, or nylon, as a spacer to facilitate nutrient and air exchange among the layer of carriers in order to roll, stack or pack together to form a matrix bed in a packed-bed bioreactor, especially Bello-Cell®, and/or TideCell® bioreactor. The multiple layers of surface treated PET nettings/meshes could be at least one layer and up to ten or more layers depend on the thickness of the netting/mesh and/or ease of cell culture and cell recovery. When the carrier of present invention is in a form of roll, stack or pack and form a packed-bed and when applying them in BelloCell®, or TideCell® cell culture system, can contribute the maximum outcome of biomass production. This is due to the TideCell® cell culture system utilizes a culture mechanism so called TideMotion™, which is to submerge the culture carriers and emerge the culture carriers intermittently with culture media. Under this Tide-Motion™ cell culture mechanism, even dense package of the packed bed, such as roll, stack or pack, can still allow oxygen to enter the matrix bed and won't cause drowning of cells. Other cell culture bioreactors don't have the capability to culture cells under such a high density package condition.

Therefore, the current invention, when combining with BelloCell®, or TideCell® systems, can have the maximum outcome on the performance. These and other embodiments are disclosed or are obvious from and encompassed by the following detailed description.

BRIEF DESCRIPTION OF THE DRAWINGS

The following figures, given by way of examples, is not intended to limit the present invention to any specific embodiments described. The Description may be understood in conjunction with the accompanying Figures, incorporated herein by reference.

FIG. 17 is a table listing cell count and recovery rate from the carrier in a BelloCell® bottle after cell harvest in the present invention.

FIG. 18 is a table listing the result of particle count from the harvest broth containing cells in the present invention.

These and other embodiments will be described and/or will be obvious from the following detailed description.

DESCRIPTION OF THE PREFERRED EMBODIMENT

The present invention teaches a three-dimensional porous growth surface made from multiple layers of netting/mesh, is disclosed to enhance cell growth surface, promote cell immobilization, enable efficient cell recovery, reduce particle release, and thus increase cellular or biological production. The present invention further teaches a method of modifying a growth surface for eukaryotic cells comprising the steps of increasing surface area by creating porous and 3-D structure, treating a surface to encourage cell attachment, promoting cell growth and proliferation and disposing the growth surface in any conventional cell cultivating device. The growth surface enables cell growth and releases the cell/tissue mass by adding trypsin/EDTA, protease, collagenase and/or DNAse to obtain single cells after the culture is completed.

The following detailed description, given by way of example, is not intended to limit the invention to any specific embodiments described. The detailed description may be understood in conjunction with the accompanying figures, incorporated herein by reference. Without wishing to unnecessarily limit the foregoing, the following shall disclose the present invention with respect to certain preferred embodiments. The embodiments in accordance with the present invention are suitable for eukaryotic cell cultures and particularly for animal cells and/or mammalian cells. The present invention, inter alia, teaches a novel growth surface and structure suitable for culturing anchorage-dependent cells that can be easy to harvest after the cell growth is complete.

The novel growth surface according to the present invention is made from a combination of multiple layers of netting/mesh which includes a layer of netting or mesh for supporting and spacing, and one or multiple nettings or meshes for cell attachment and cell growth. The layer of netting or mesh for cell growth can be at least one layer (FIG. 1), two layers (FIG. 2), three layers (FIG. 3), or more layers depending on the requirement for the cell growth.

Figure 1:
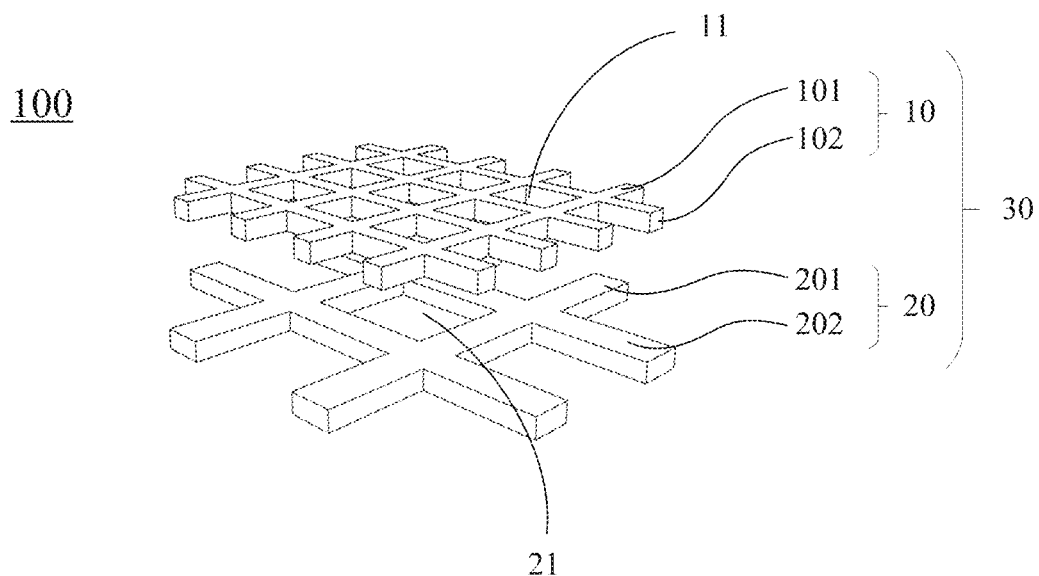
FIG. 1 is an explosive scaling-up schematic diagram that shows a novel carrier structure of the present invention made by two layers of netting/mesh in the present invention.

FIG. 1 shows a novel carrier structure of the present invention wherein the structure is made by two layers of netting/mesh. The top one layer is made with smaller opening size from 30 um to 800 um while the bottom layer is made with larger opening size from 1 mm to 5 mm. The top layer are made with materials that are ease of surface treatment, such as polyethylene terephthalate, while the bottom layer is made with any materials, such as s polyethylene terephthalate (PET), polypropylene, polyethylene (PE), polytetrafluoroethylene (PTFE) or nylon, that are rigid and can work as spacer and supporter during the construction of matrix bed. The top one layer of netting/mesh is surface treated to be biocompatible and hydrophilic, which can facilitate cell attachment and growth. The bottom layer of netting/mesh, which works as a spacer when constructing the matrix bed, does not require any treatment even with treatment does not affect its function. Furthermore, the surrounding of the whole two-layer netting/mesh structure is sealed by heat press, ultrasonic press or adhesive to further prevent or reduce the release of netting fibers and particles.

Shown in FIG. 1, a carrier or carrier structure 100 includes a netting/mesh structure unit 30. The netting/mesh structure unit 30 includes: at least a first netting/mesh film 10 with a plurality of first meshes 11 formed by crossing a plurality of first longitude lines 101 and a plurality of first latitude lines 102, wherein the first netting/mesh film 10 is biocompatible and hydrophilic; and at least a second netting/mesh film 20 with a plurality of second meshes 21 formed by crossing a plurality of second longitude lines 201 and a plurality of second latitude lines 202, wherein the second netting/mesh film 20 is parallel to the first netting/mesh film 10 and disposed under or on the first netting/mesh film 10. In one embodiment, the opening (pore dimension) of the second mesh 21 is larger than the opening (pore dimension) of the first mesh 11. Moreover, multitudes of the first mesh 11 have an opening direction vertical to both the first longitude lines 101 and the first latitude lines 102. The multitudes of the second mesh 21 have an opening direction vertical to both the second longitude lines 201 and the second latitude lines 202.

Figure 2:
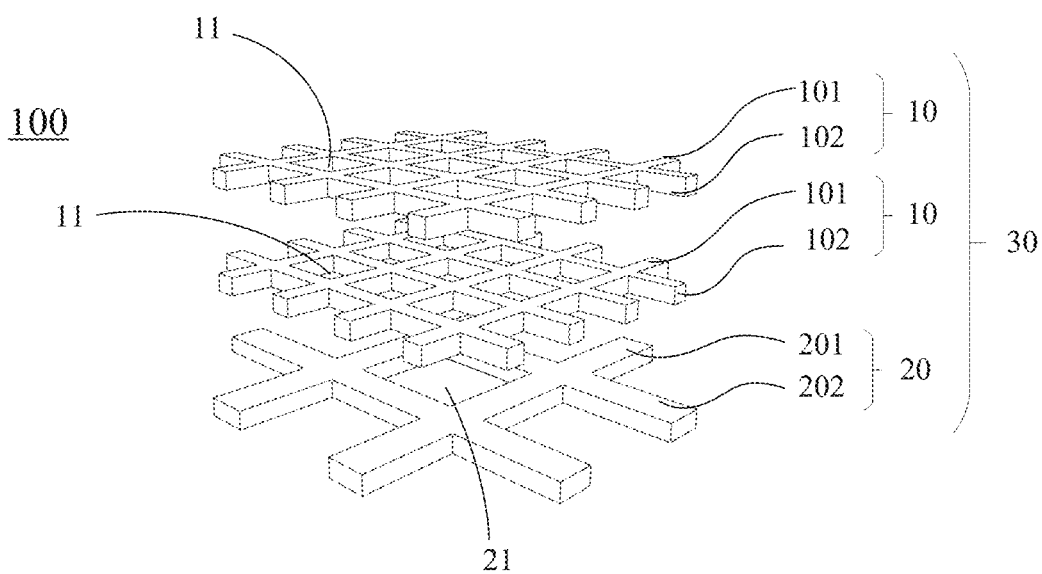
FIG. 2 is an explosive scaling-up schematic diagram that shows a novel carrier structure of the present invention made by three layers of netting/mesh in the present invention.

FIG. 2 shows a novel carrier structure made by three layers of netting/mesh which may include two layers of the first netting/mesh film 10 and one layer of the second netting/mesh film 20. Shown in FIG. 2, the top two layers are made with smaller opening size from 30 um to 800 um while the bottom layer is made with larger opening size from 1 mm to 5 mm. The top two layers are made with materials that are ease of surface treatment, such as polyethylene terephthalate, while the bottom layer is made with any materials, such as polyethylene terephthalate (PET), polypropylene (PP), polyethylene (PE), polytetrafluoroethylene (PTFE) or nylon, that are rigid and can work as spacer and supporter during the construction of matrix bed. The top two layers of netting/mesh are surface treated to be biocompatible and hydrophilic, which can facilitate cell attachment and growth. The bottom layer of netting/mesh, which works as a spacer when constructing the matrix bed, does not require any treatment even with treatment does not affect its function. Furthermore, the surrounding of the whole three-layer netting/mesh structure is sealed by heat press, ultrasonic press or adhesive to further prevent or reduce the release of netting fibers and particles.

In FIG. 2, the second netting/mesh film 20 is disposed under the two layers of the first netting/mesh film 10, but it is not limited in the present invention. The second netting/mesh film 20 may be disposed between or on the two layers of the first netting/mesh film 10.

Figure 3:
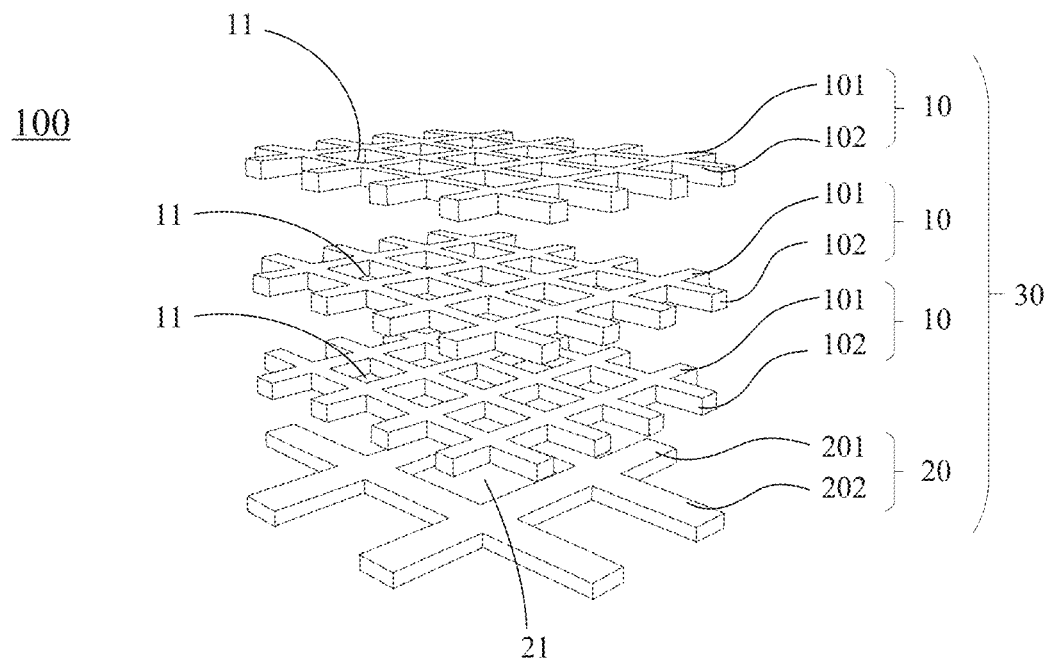
FIG. 3 is an explosive scaling-up schematic diagram that shows a novel carrier structure of the present invention made by four layers of netting/mesh in the present invention.

FIG. 3 shows a novel carrier structure made by four layers of netting/mesh which may include three layers of the first netting/mesh film 10 and one layer of the second netting/mesh film 20. The top three layers are made with smaller opening size from 30 um to 800 um while the bottom layer is made with larger opening size from 1 mm to 5 mm. The top three layers are made with materials that are ease of surface treatment, such as polyethylene terephthalate, while the bottom layer is made with any materials, such as polyethylene terephthalate (PET), polypropylene (PP), polyethylene (PE), polytetrafluoroethylene (PTFE) or nylon, that are rigid and can work as spacer and supporter during the construction of matrix bed. The top three layers of netting/mesh are surface treated to be biocompatible and hydrophilic, which can facilitate cell attachment and growth. The bottom layer of netting/mesh, which works as a spacer when constructing the matrix bed, does not require any treatment even with treatment does not affect its function. The surrounding of the four-layer structure is sealed by heat press, ultrasonic press or adhesive to further prevent or reduce the release of netting fibers and particles.

In FIG. 3, the second netting/mesh film 20 is disposed under the three layers of the first netting/mesh film 10, but it is not limited in the present invention. The second netting/mesh film 20 may be disposed between any two layers of the first netting/mesh film 10 or on the three layers of the first netting/mesh film 10.

Figure 4:
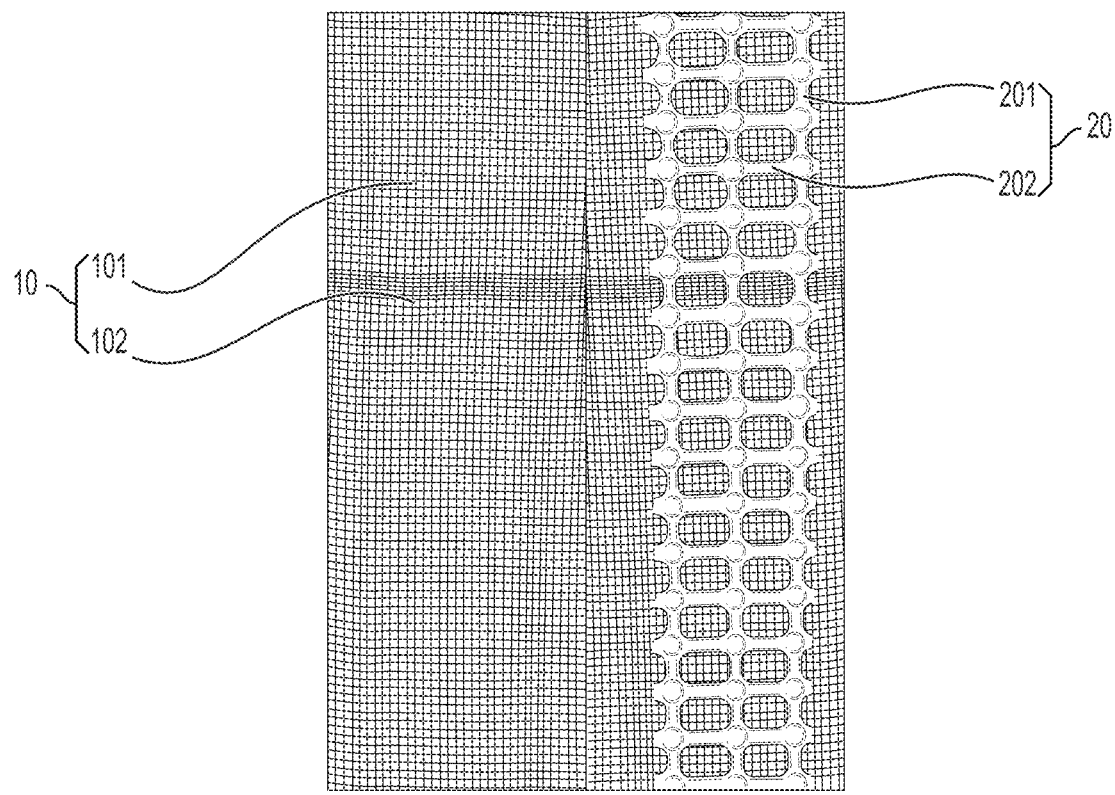
FIG. 4 is a top-view schematic diagram that shows a novel carrier structure of the present invention with its surrounding sealed by heat press, ultrasonic press or adhesive in the present invention.

Besides, to meet design requirement, the openings (pore dimensions) of the first meshes 11 of the first netting/mesh film 10 may be totally or partially the same by adjusting the spaces between each of the first longitude lines 101 and each of the first latitude lines 102, as well as the ones of the second meshes 21 of the second meshes 20 with help of adjusting the second longitude lines 201 and the second latitude lines 202. Furthermore, that a diameter of a yarn as a longitude or latitude line in the present invention is far longer than the one of a cell may be easily filtered out to separate from the cells. In one embodiment, a width of the yarn of the netting/mesh structure may be from 50 um to 1000 um, or precisely, from 100 um to 500 um that is far larger than cell diameter of 5~20 um. Accordingly, any yarn that even falls off from the netting/mesh structure is easily separated from the cell by any suitable filtering way. Shown in FIG. 4, the edge surround of the first netting/mesh film 10 and the edge surround of the second netting/mesh film 20 are sealed together by heat pressing, ultrasonic or adhesive treatment, openings at the surrounding are filled with melting materials because of heat pressing treatment in FIG. 4. Such an approach may prevent or reduce unwanted fibers or particles released from the netting/mesh structure during the cell harvest.

The rigid support (the second netting/mesh film 20), for example, a netting or mesh made by polypropylene or nylon, is porous, one layer above or under the cell growth nettings/meshes, and is for supporting and spacing purpose (FIGS. 5, 6, 7) when the carriers are rolled (FIG. 5 and FIG. 6) or stacking (FIG. 7) together and form a packed-bed inside a bioreactor, e.g. BelloCell® or TideCell® bioreactors.

Figure 5:
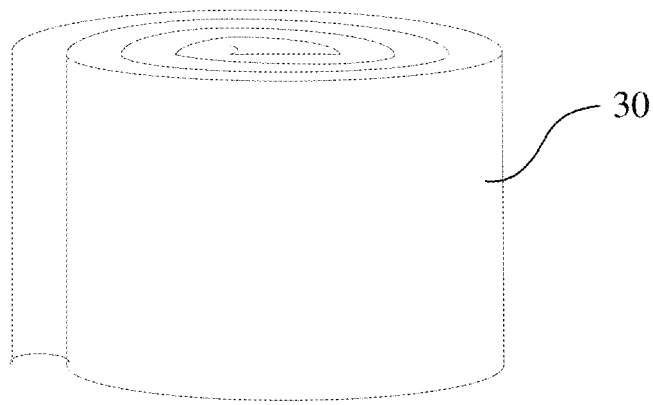
FIG. 5 is a side-view schematic diagram showing a single rolling carrier structure of the present invention.
Figure 6:
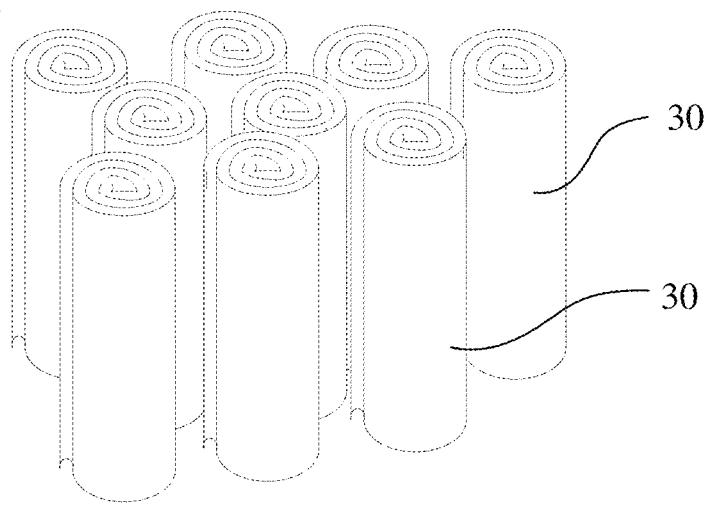
FIG. 6 is a side-view schematic diagram showing plural rolling carrier structures of the present invention.
Figure 7:
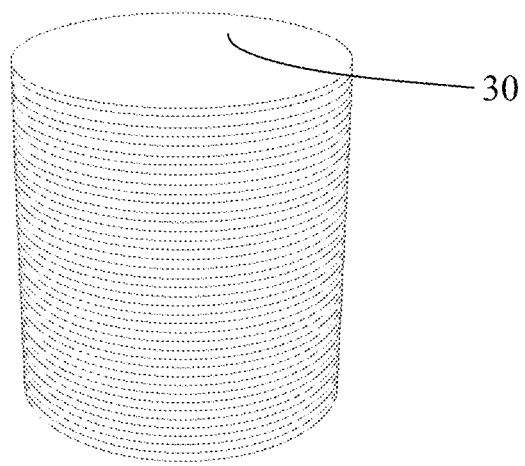
FIG. 7 is a side-view schematic diagram showing plural stacking carrier structures of the present invention.

FIG. 5 shows a novel carrier structure of the present invention wherein the matrix bed can be constructed by rolling the multilayer netting/mesh structure unit 30 into a column to form a matrix bed 200 while the bottom netting/mesh work as a spacer between each structure to allow the culture medium or oxygen to flow freely during cell culture. However, such a column is not limited to the present invention. FIG. 6 shows the matrix bed 210 that is constructed by arranging plural rolling netting/mesh structure units 30. FIG. 7 shows a novel growth surface structure of the present invention wherein the matrix bed 300 can be constructed by stacking the carriers (the netting/mesh structure unit 30) of the present invention in the vessel where the carriers are cut in a sheet with dimension with any shape or size preferably from 2 cm×2 cm to 2 m×2 m that are capable to form a matrix bed 300. However, in another embodiment, the matrix bed may be constructed by randomly disposed packing many netting/mesh structure units 30 like one shown in FIG. 12.

Figure 8:
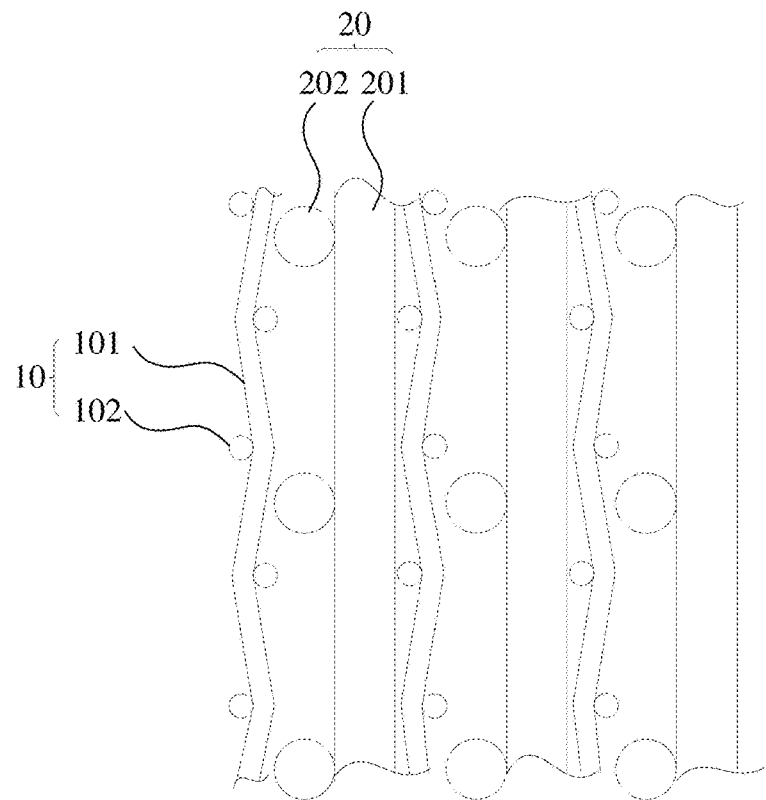
FIG. 8 is a cross-view scaling-up schematic diagram that shows a novel carrier of the present invention having three two-layer sheets of netting/mesh in the present invention.

FIG. 8 is a cross-view scaling-up schematic diagram that shows a novel carrier of the present invention having three two-layer sheets of netting/mesh. Please refer to FIG. 1 and FIG. 8, FIG. 8 shows a microscopic view of the novel carrier structure after rolling or stacking or randomly disposed packing and form a matrix bed in a bioreactor, where in the carrier is make by one layer of hydrophilic netting/mesh (the first netting/mesh film 10) and a layer of non-treated netting/mesh (the second netting/mesh film 20) as spacer. The netting/mesh for spacer is with larger diameter and could allow culture medium, solution, air to penetrate freely.

Figure 9:
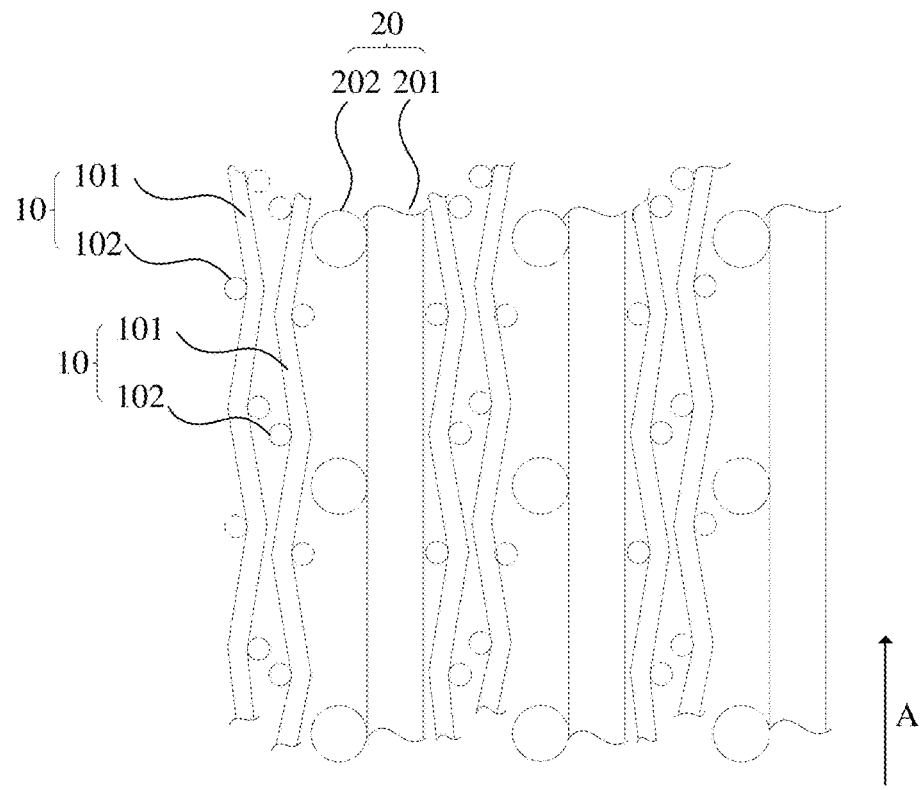
FIG. 9 is a cross-view scaling-up schematic diagram that shows a novel carrier of the present invention having three three-layer sheets of netting/mesh in the present invention.

FIG. 9 is a cross-view scaling-up schematic diagram that shows a novel carrier of the present invention having three three-layer sheets of netting/mesh. Please refer to FIG. 2 and FIG. 9, FIG. 9 shows a microscopic view of the novel carrier structure after rolling or stacking or randomly disposed packing and form a matrix bed in a bioreactor, where in the carrier is make by two layers of hydrophilic netting/mesh (the first netting/mesh film 10) and a layer of non-treated netting/mesh (the second netting/mesh film 20) as spacer. The netting/mesh for spacer is with larger diameter and could allow culture medium, solution, air to penetrate freely.

Figure 10:
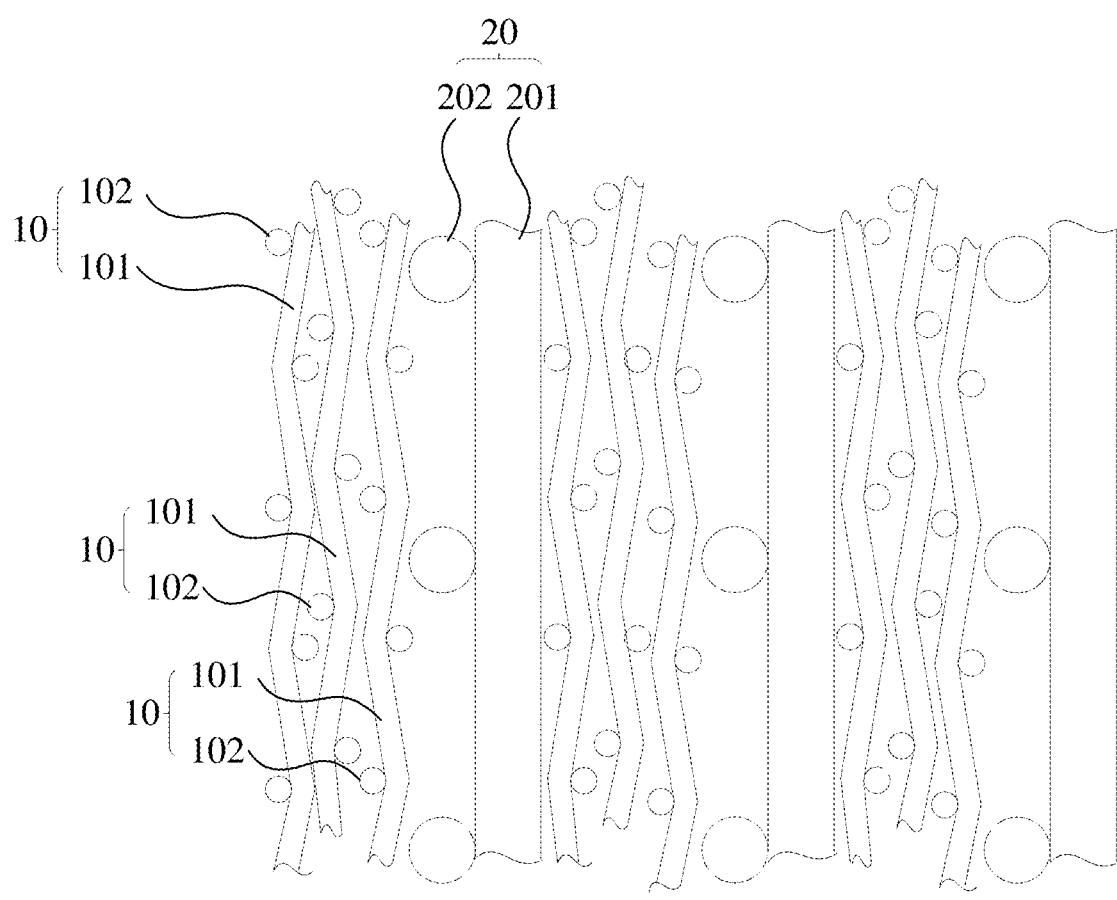
FIG. 10 is a cross-view scaling-up schematic diagram that shows a novel carrier of the present invention having three four-layer sheets of netting/mesh in the present invention.

FIG. 10 is a cross-view scaling-up schematic diagram that shows a novel carrier of the present invention having three four-layer sheets of netting/mesh. Please refer to FIG. 3 and FIG. 10, FIG. 10 shows a microscopic view of the novel carrier structure after rolling or stacking or randomly disposed packing and form a matrix bed in a bioreactor, where in the carrier is make by three layers of hydrophilic netting/mesh (the first netting/mesh film 10) and a layer of non-treated netting/mesh (the second netting/mesh film 20) as spacer. The netting/mesh for spacer is with larger diameter and could allow culture medium, solution, air to penetrate freely.

The netting or mesh for cell culture (the first netting/mesh structure film 10) is made by any nature or artificial polymers but preferable polyethylene terephthalate (PET) which are easier for surface treatment. Due to the netting/mesh is with precise and consistent dimension in opening, it could improve the culture with better and consistent performance. Please refer back to FIGS. 1, 2 and 3, the netting/mesh 11 of the first netting/mesh film 10 is in an open direction vertical to both the first longitude line 101 and the first latitude line 102. Similarly, the netting/mesh 21 of the second netting/mesh film 20 is in an open direction vertical to both the second longitude line 201 and the second latitude line 202. Accordingly, that the opening direction of the netting/mesh 11 of the first netting/mesh film 10 is consistent with the one of the netting/mesh 12 of the second netting/mesh film 20 is beneficial to cell culturing and consistent preformation. Due to the openings on the multiple layers of netting or mesh are toward the same direction, which can facilitate cell release and recovery from the growth surface. The multilayer netting/mesh structure combining both cell growth layers and non-cell growth supporting layer are optionally sealed on the surrounding of the structure by heat press, ultrasonic or adhesive treatment in order to prevent or reduce fiber and particle release.

The opening (pore dimension) inside the porous structure for cell growth (the first netting/mesh film 10) could range from 30 um to 800 um. More preferably, the opening (pore dimension) of the first netting/mesh film 10 could range from 50 um to 200 um. The opening (pore dimension) inside the supporting netting/mesh (the second netting/mesh film 20) could range from 1 mm to 10 mm. More preferably, the opening (pore dimension) of the second netting/mesh film 20 could range from 2 mm to 5 mm.

The carriers in accordance with the present invention provide a maximum surface area to facilitate cell attachment, cell adhesion and cell proliferation, and easy of cell dislodge, thereby providing a maximum cell density and thus, maximum cellular products.

The novel growth surface of the present invention can be in any size, shape, form, structure or geometric configuration so long as it is in accordance with the present invention. The growth surface of the instant invention can be in any suitable form, such as a pellet, a strip, a sheet, or any three-dimensional structure. In one embodiment, the growth surface is in the form of sheets (netting/mesh structure unit 30) that are rolled to form a column (as the matrix bed 200 shown in FIG. 5) or multiple columns (as the matrix bed 210 shown in FIG. 6) and place inside a culture tank, a culture vessel, or a bioreactor. For example, TideCell® or BelloCell® bioreactors. The layer of nettings or meshes are with larger dimension so as to roll to form a single fixed bed unit instead of disposing small pieces of carriers in a restricted and defined area to form a fixed bed. The dimension of the sheet made by nettings/meshes fabric before rolling can be from 1 cm (height)×20 cm (width), to 10 m×100 m, depending on the size of the fixed bed. More precisely, the dimension of the sheet made by nettings/meshes fabric can be from 3 cm (height)×50 cm (width), to 2 m (height)×20 m (width).

In another embodiment, the growth surface is in the form of sheets (netting/mesh structure unit 30) that are stacked to form a column or multiple columns (as the matrix bed 300 shown in FIG. 7) and place inside a culture tank, a culture vessel, or a bioreactor. For example, TideCell® or BelloCell® bioreactors. The layer of nettings or meshes are with larger dimension so as to stack to form a single fixed bed unit instead of disposing small pieces of carriers in a restricted and defined area to form a fixed bed. The dimension of the sheet made by nettings/meshes fabric before stacking can be from 1 cm×1 cm square, or 1 cm circle in diameter, to 2 m×2 m, or 2 m circle in diameter, or any other shape and dimension, depending on the dimension and shape of the fixed bed. More preferably, the dimension of the sheet made by nettings/meshes fabric can be from 5 cm×5 cm, or 5 cm circle in diameter, to 0.5 m×0.5 m, or 0.5 m circle in diameter.

When the carrier of present invention is in a form of roll, and when applying the carriers in TideCell® cell culture system, can contribute the maximum outcome of biomass production. This is due to the TideCell® cell culture system utilizes a culture mechanism so called TideMotion™, which is to submerge the culture carriers and emerge the culture carriers intermittently with culture media. Under this TideMotion™ cell culture mechanism, even dense package of the packed bed, such as roll, or stack or pack, can still allow oxygen to enter the matrix bed and won't cause drowning of cells. Other cell culture bioreactors don't have the capability to culture cells under such a high density package condition. Therefore, the current invention, when combining with BelloCell®, or TideCell® systems, can have the maximum outcome on the performance of cell culture.

One of skill in the art will understand that certain characteristics of a growth surface can have an effect on its performance. Carrier or surface characteristics, such as surface properties, carrier density, size, toxicity and rigidity can affect the performance of the growth surface and thus the performance of the cell culture particularly with respect to the cell density and the overall production of cellular products. Specifically, the size of the pores of the growth surfaces can affect the performance of the cells. Although one of ordinary skill in the art will appreciate that any growth surface pore size known will be suitable, the pore size is preferably in the range from 30 micrometer to 800 micrometers.

Cell culture can cover most eukaryotic cells, more specifically animal cells, and more specifically mammalian cells. For example, dermal fibroblasts, mesenchymal stem cells from bone marrow, mesenchymal stem cells from Wharton's Jelly, adipose derived mesenchymal stem cells from adipose tissue, . . . , etc.

After cell growth, cells can be easily dislodged and recovered from the growth surface of present invention by following conventional cell recovery procedure through trypsinization or other enzymatic treatment such as collagenase, AccuMAX, Accutase, TrypLE, etc.

Example 1 Material Preparation

Figure 11:
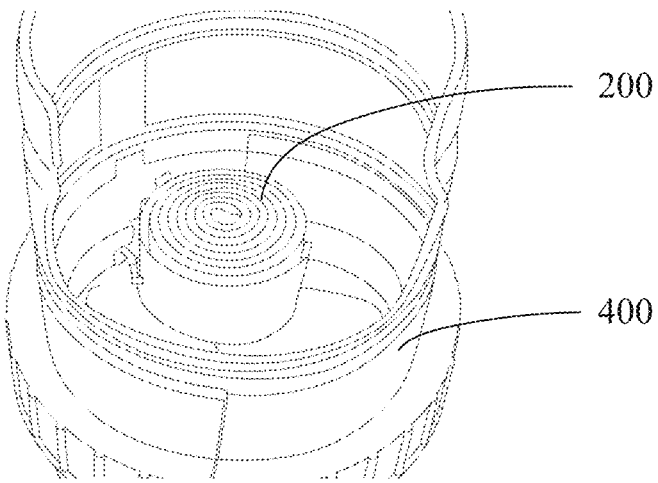
FIG. 11 is a partially stereoscopic schematic diagram that shows a cultivating carrier system with a rolling carrier structure of the present invention.

This example describes the cell growth on the porous structures of the invention. Material and Methods: PP Netting with 3 mm×3 mm grid dimension was prepared. PET netting with 200 um×200 um grid dimension was prepared. The netting was sized to 43 cm long×3 cm wide. Two layers of PET netting were place above the PP netting, then rolled the sheet to form a column with around 4 cm diameter and 3 cm height (as the matrix bed 200 shown in FIG. 5). The column was placed inside a BelloCell® bottle (CESCO® Bioengineering Co., Ltd.) and sterilized with gamma irradiation at a dose range from 25 to 35 kGy (shown in FIG. 11). The microscopic structure, after rolling into a column, is illustrated in FIG. 9. It is noted that before rolling into the column, the two layers of PET netting and one layer of PP netting are sealed at the edge surround by heat, ultrasound or adhesive to form enclosed surrounding.

Example 2 Cell Culture

Mesenchymal stem cells (MSCs) isolated from human Wharton's Jelly were prepared and total MSCs of $3 \times 10^7$ cells in 100 ml culture medium were loaded into the BelloCell® bottle with the carriers of present invention, and seed for 3 hours. After checking the seeding efficiency was above 90%, 400 ml fresh culture medium was added to make total culture medium volume of 500 ml. The BelloCell® was then installed on the BelloStage™-3000 machine (CESCO® Bioengineering Co., Ltd.) and operated with the below parameters: Up rate: 1 mm/s; T_H: 10 secs; Down rate: 1 mm/s; B_H: 30 mins at 37 Degree Celsius and 5% CO2. Cell growth was checked by day $4^{th}$ and day $8^{th}$ Cell harvest was done by day $8^{th}$ after confirming the cell growth has reached confluency.

Figure 12:
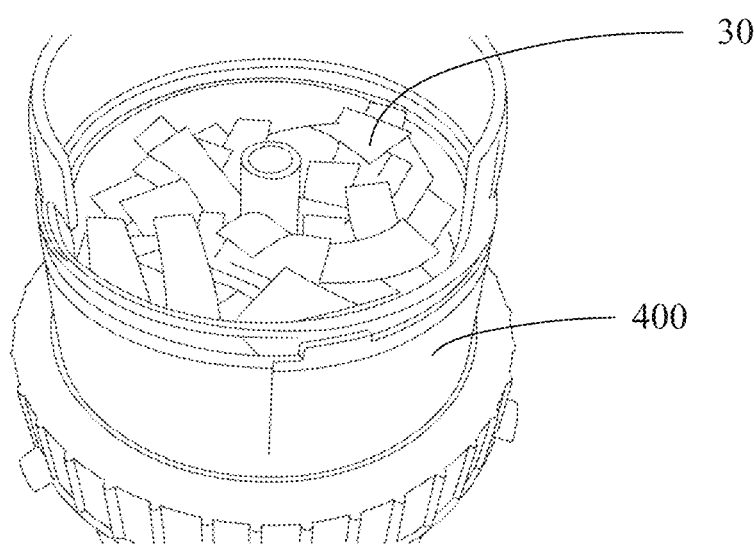
FIG. 12 is a partially stereoscopic schematic diagram that shows a cultivating carrier system with randomly disposed carrier structures of the present invention.

The types of the carrier in the present invention may be a stacking pack constituted by random disposed packing plural netting/mesh structure units shown in FIG. 12. FIG. 12 is a partially stereoscopic schematic diagram that shows a cultivating carrier system with randomly disposed carrier structures of the present invention. In FIG. 12, the netting/mesh structure units 30 may be strips and randomly disposed or packed in a cultivating chamber 400 to form a matrix bed in BelloCell® bottle for cell cultivation.

Figure 13:
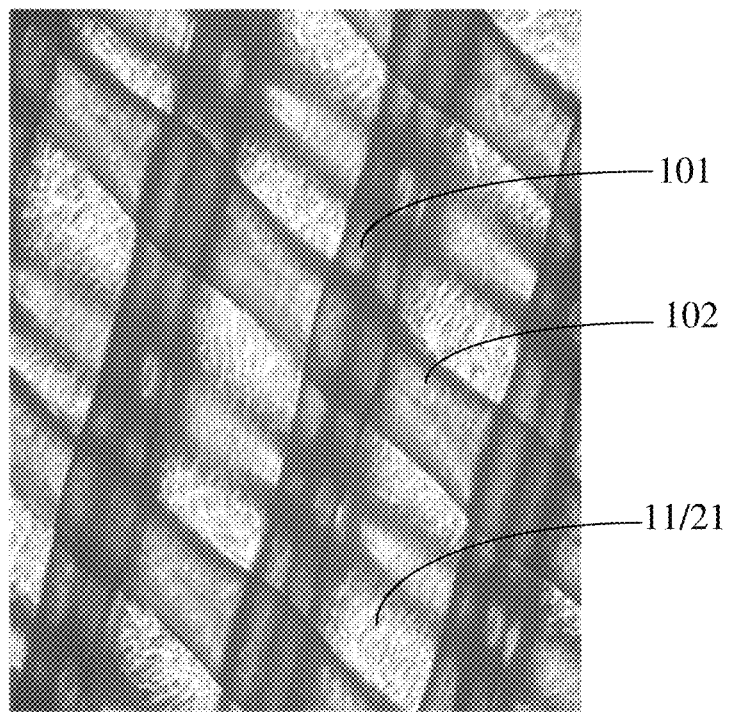
FIG. 13 is a partial microscopic scale-up top-view schematic diagram showing the mesenchymal stem cell growth in the carriers form dense and 3D structure in the present invention.
Figure 14:
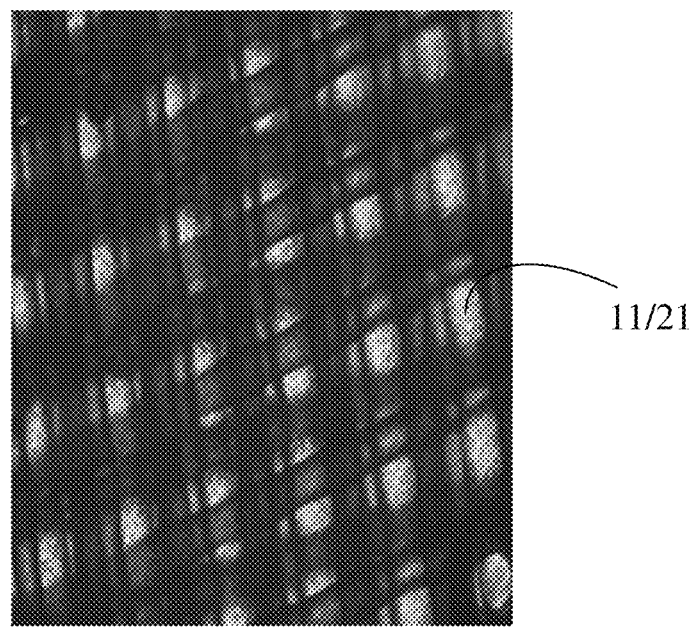
FIG. 14 shows the mesenchymal stem cell growth in the carriers form dense and 3D structure in the present invention.

FIG. 13 shows the mesenchymal stem cell growth in the carriers form dense and 3D structure. The carrier is constructed by two layers of PET netting (mesh) and one layer of PP netting (mesh). Please refer to FIG. 2 and FIG. 13, the exemplary carrier structure is constituted by two layers of PET netting/mesh and one layer of PP netting/mesh, and the netting/mesh 21 of the second netting/mesh film is bigger than the netting/mesh 11 of the first netting/mesh film. In a microscopic view, there may be two nettings/meshes 11 shown within the netting/mesh 21 to provide cells to grow. FIG. 14 shows the mesenchymal stem cell growth in the carriers form dense and 3D structure. The carrier is constructed by three layers of PET netting (mesh) and one layer of PP netting (mesh). Please refer to FIG. 3 and FIG. 14, the exemplary carrier structure is constituted by three layers of PET netting/mesh and two layers of PP netting/mesh, and the three overlapped first netting/mesh films look darker than one in FIG. 12 under the microscopic observation.

Figure 15:
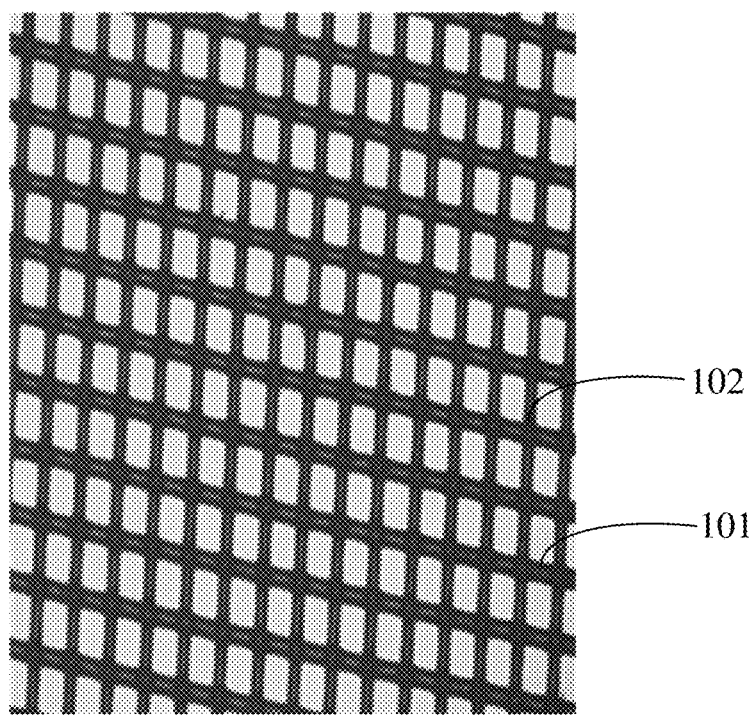
FIG. 15 shows the carriers by peeling one layer to observe the remaining cells after cell harvest in the present invention.
Figure 16:
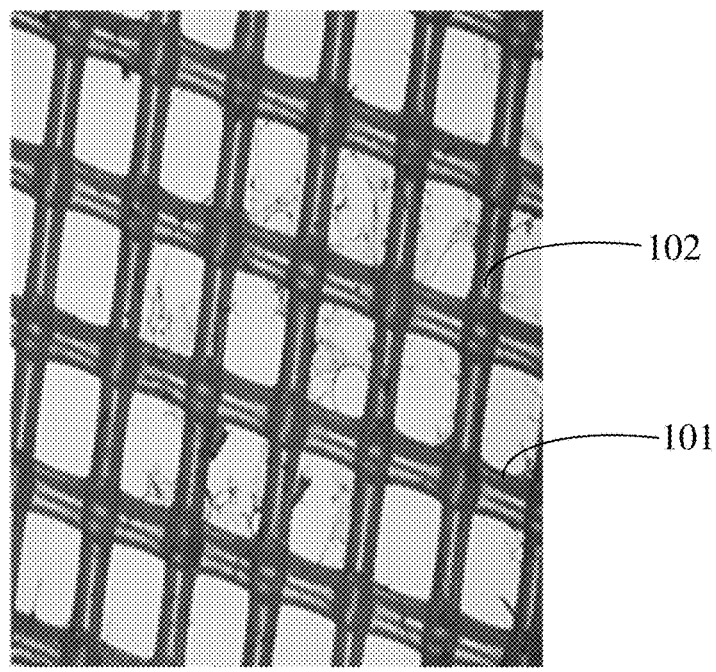
FIG. 16 shows the carriers by peeling one layer to observe the remaining cells after cell harvest in the present invention.

FIG. 15 shows the carriers by peeling one layer to observe the remaining cells after cell harvest wherein the carrier is constructed by two layers of PET netting/mesh and one layer of PP netting/mesh. Please refer to FIG. 2 and FIG. 15, there is no residual cell observed on the PET netting/mesh after cell harvest. FIG. 16 shows the carriers by peeling one layer to observe the remaining cells after cell harvest wherein the carrier was constructed by three layers of PET netting/mesh and one layer of PP netting/mesh. Please refer to FIG. 3 and FIG. 16, there are little extracellular matrixes and cells observed at some limited area after cell harvest.

Example 3 Cell/Tissue Releasing

After cell growth has reach confluence, the growth surface was rinsed with D-PBS for three times, and then submerged the growth surface with trypsin/EDTA for 5 minutes. The trypsin/EDTA solution was discarded before cell detach. A tapping and shaking was addressed on the BelloCell® bottle and allowed the growth surface to hit the wall of BelloCell® bottle in order to force the cell detachment, followed by washing with D-PBS. The tapping/shaking and rinsing cycle was repeated for 3 times. All harvest was collected, centrifuged, re-suspend and check the overall cell number and viability. Result is shown in FIG. 17 after cell harvest. Data shows the cell density can reach over $9 \times 10^7$ cells per BelloCell® bottle with two layers (group 1) and three layers (group 2) of PET netting structure in the size of 4 cm (diameter)×3 cm (height). Recovery rate was estimated by checking the stained cells on the growth surface. By estimating the overall cell productivity, if increasing the matrix bed to fill the BelloCell® matrix bed space, the cell productivity could reach over $8 \times 10^8$ cells per BelloCell® bottle. In contrary to BioNOC® II carriers in one BelloCell® bottle, only around $2 \times 10^8$ cells could be obtained with around 70~80% of recovery rate (data not shown). Total four folds increased on cell productivity can be reached with the carriers of the present invention. Moreover, there is no artificial particles could be observed after cell harvest, shown in FIG. 18. Regarding particle releasing issue, over 14,000 fibers could be found in one BelloCell® bottle with BioNOC® II carriers after cell harvest. Comparing with the particles generated from BioNOC® II carriers in a BelloCell® bottle, there is no extra downstream process for particle removal is required with the carriers of present invention.

Accordingly, the carrier system for cell cultivation in the present invention has a three-dimension porous structure constituted by plural netting/mesh structures in different nettings/meshes. These netting/mesh films have openings in consistent direction so as to strength surface of cell growth, improve cell anchoring, benefiting cell harvest, and improve biomass production. Moreover, compared to previous carrier of nonwoven material, the carrier structure in the present invention may reduce possibility of extra particle production, production cost and time wastage.

What is claimed is:

1. A carrier for cell culture comprising a netting/mesh structure unit, the netting/mesh structure unit comprising:
    at least a first netting/mesh film with a plurality of first meshes formed by crossing a plurality of first longitude lines and a plurality of first latitude lines, wherein the first netting/mesh film is biocompatible and hydrophilic; and
    at least a second netting/mesh film with a plurality of second meshes formed by crossing a plurality of second longitude lines and a plurality of second latitude lines, wherein the second netting/mesh film is parallel to the first netting/mesh film and disposed under or on the first netting/mesh film;
    wherein any one of the first longitude lines, any one of the first latitude lines is of a width from 50 um to 500 um, wherein any one of the second longitude lines, or any one of the second latitude lines is of a width from 100 um to 1000 um.

2. A carrier for cell culture according to claim 1, wherein the netting/mesh structure unit comprises two layers of the first netting/mesh film and one layer of the second netting/mesh film, and wherein the second netting/mesh film is disposed between the two layers of the first netting/mesh film, or on the two layers of the first netting/mesh film, or under the two layers of the first netting/mesh film.

3. A carrier for cell culture according to claim 1, wherein the netting/mesh structure unit comprises at least three layers of the first netting/mesh film and one layer of the second netting/mesh film, and wherein the second netting/mesh film is disposed between any two layers of the first netting/mesh film, or on the three layers of the first netting/mesh film, or under the three layers of the first netting/mesh film.

4. A carrier for cell culture according to claim 1, wherein a material of the first netting/mesh film comprises polyethylene terephthalate (PET), and a material of the second netting/mesh film comprises polyethylene terephthalate (PET), polypropylene (PP), polyethylene (PE), polytetrafluoroethylene (PTFE) or nylon.

5. A carrier for cell culture according to claim 1, wherein the first netting/mesh film is of a netting/mesh material with hydrophilic surface treatment and the second netting/mesh film is of supportive netting/mesh material.

6. A carrier for cell culture according to claim 1, wherein an opening of any one of the first meshes is from 30 um to 800 um, and an opening of any one of the second meshes is from 1 mm to 5 mm.

7. A carrier for cell culture according to claim 1, wherein a type of the carrier is one or more columns by curling the netting/mesh structure unit, one or more columns by sequent laminating the plural netting/mesh structure units, or a stacked body by randomly disposed packing the netting/mesh structure units.

8. A carrier for cell culture according to claim 1, wherein edge surrounds of the first netting/mesh film and the second netting/mesh film are sealed together by heat pressing, ultrasonic or adhesive treatment.

9. A carrier for cell culture according to claim 1, wherein openings of the first meshes of the first netting/mesh film are totally or partially the same.

10. A carrier for cell culture according to claim 1, wherein openings of the second meshes of the second netting/mesh film are totally or partially the same.

11. A carrier for cell culture according to claim 1, wherein any one of the first longitude lines, any one of the first latitude lines is of a width from 50 um to 250 um, wherein any one of the second longitude lines, or any one of the second latitude lines is of a width from 250 um to 500 um.

12. A cell culture device comprising the carrier for cell culture according to claim 1 and a culturing chamber disposing the carrier for cell culture.

13. A cell culture device according to claim 12, wherein the netting/mesh structure unit is curled to form one or more columns to be put into the culturing chamber; or multitude of the netting/mesh structure units are sequent laminated to form one or more columns to be put into the culturing chamber; or multitude of the netting/mesh structure units are randomly disposed or packed to form a stacked body to be put into the culturing chamber.

14. A cell culture device according to claim 12, wherein the netting/mesh structure unit comprises two or three layers of the netting/mesh film and one layer of the second netting/mesh film, and wherein the second netting/mesh film is disposed between any two layers of the first netting/mesh film, or on all the layers of the first netting/mesh film, or under all the layers of the first netting/mesh film.

15. A cell culture device according to claim 12, wherein a material of the first netting/mesh film comprises polyethylene terephthalate (PET), and a material of the second netting/mesh film comprises polyethylene terephthalate (PET), polypropylene (PP), polyethylene (PE), polytetrafluoroethylene (PTFE) or nylon.

16. A cell culture device according to claim 12, wherein the first netting/mesh film is of a netting/mesh material with hydrophilic surface treatment and the second netting/mesh film is of supportive netting/mesh material.

17. A cell culture device according to claim 12, wherein an opening of any one of the first meshes is from 30 um to 800 um, and an opening of any one of the second meshes is from 1 mm to 5 mm.

* * * * *